United States Patent [19]
Portner et al.

[11] 3,940,209
[45] Feb. 24, 1976

[54] PROJECTOR CASE ASSEMBLY

[75] Inventors: Robert Portner, Blackwood; Phillip Miller, Turnersville, both of N.J.

[73] Assignee: Magna Mir, Inc., Philadelphia, Pa.

[22] Filed: July 12, 1974

[21] Appl. No.: 487,962

[52] U.S. Cl. ............................ 353/79; 353/99; 353/119
[51] Int. Cl.² ............................................. G03B 21/28
[58] Field of Search ............ 353/69, 72, 73, 79, 97, 353/98, 99, 119, 71

[56] References Cited
UNITED STATES PATENTS

| | | | |
|---|---|---|---|
| 2,651,967 | 9/1953 | Thomas | 352/104 |
| 3,623,802 | 11/1971 | Hubner | 353/78 |
| 3,695,746 | 10/1972 | Youngblood | 353/71 |
| 3,749,472 | 7/1973 | Young | 353/73 |
| 3,867,024 | 2/1975 | Smith | 353/99 |

*Primary Examiner*—Richard E. Aegerter
*Assistant Examiner*—Steven L. Stephan
*Attorney, Agent, or Firm*—Steele & Petock

[57] ABSTRACT

A projector case assembly designed for use with a projector system which utilizes a system of mirrors to provide enlarged panoramic viewing. The projector case assembly is designed to accommodate any standard movie or slide projector and it serves as both support means during the time of actual projection and as a storage means when the equipment is not in use.

3 Claims, 5 Drawing Figures

PROJECTOR CASE ASSEMBLY

BACKGROUND OF THE INVENTION

The subject invention relates to a case-like device which is used to position a projector and a series of mirrors to permit greatly magnified images to be produced on a screen or other receiving surface with the case in asymetrical position.

As is disclosed in copending applications Ser. No. 488,074 and Ser. No. 488,011, by using a specially configurated convex external mirror in conjunction with a flat auxiliary mirror, a distortion free image may be obtained on a large sized screen such as disclosed in application Ser. No. 488,010.

Necessarily, as will be clear from copending application Ser. No. 488,074, precise positioning of the elements of the system is requisite to high quality movies or slides. While such precise positioning of the elements of the system as described in the aforementioned copending application, can be obtained in a variety of ways, the appeal of the system is diminished if in fact the elements cannot be made operational with a minimum of adjustments on the part of the user.

Since the mirrors used in the system are high quality optical instruments, they must be protected both when in use, and when not, to prevent damage which will diminish their effectiveness.

SUMMARY OF THE INVENTION

Accordingly, it is an object of the subject invention to provide a projection case assembly which through a minimum of adjustment can be used to position elements of a projection system, including external mirrors which are utilized for the purpose of obtaining enlarged distortion free pictures.

It is a related object of the subject invention to provide a projection case assembly which has adjustability features to permit precise positioning of the elements of the aforementioned system.

It is still another object of the subject invention to provide a projection case assembly in which elements of the projection system may be stored in such manner as to minimize possible damage thereto.

It is but another object of the subject invention to provide a projection case assembly for a system of enlarged movies which is adapted to accommodate any standard movie or slide projector regardless of its physical characteristics.

It is yet another object of the subject invention to provide a projection case assembly for elements of a projection system used for producing greatly enlarged images, on the order of eight to one over standard projector focal lengths in which the elements of the system may be assembled and aligned rapidly.

It is still one other object of the subject invention to provide a projection case assembly for a projection system which includes means for separately aligning each individual element of this system to provide for maximum optical efficiency.

It is another object of the subject invention to provide a projector case assembly in which the mirrors and other elements may be compactly stored to avoid problems in handling and the like.

It is a related object of the subject invention to provide a projector case which can be used to transport the unique elements of the panoramic viewing system from location to location.

It is one more object of the subject invention to provide a projector case which serves as a shipping case for the unique mirrors and other elements of the panoramic viewing system.

It is still another object of the subject invention to provide a projection case assembly for a projection system in which a light shield is included in the case structure.

In accordance with the above objects, a projector case assembly has been developed to be compatible with the projection system which forms the subject matter of the aforementioned copending applications in which enlarged distortion free pictures may be obtained by using a system of mirrors with a standard slide or movie projector. The projection case assembly is designed to accommodate any standard type of movie or slide projector regardless of physical configurations either as direct view or as permitted by a vertically adjustable sliding system of aligning mirrors which will cause the beam from the projection source to be reflected to the principal mirrors of the system which comprise a flat auxiliary mirror and uniquely designed convex mirror from which images are reflected onto an enlarged screen. The projection case assembly may be utilized to store the mirror system and related elements within. It features a series of adjustment devices to align both the case assembly as a whole, and its individual members, with the screen.

The projection case assembly includes a horizontal support element on which any standard projector may be supported; a foldable upright portion having the means to support a large convex mirror for the system; supporting means for alignment mirrors which are used to align the projection beam with a basic flat auxiliary mirror for the system; and extension means for supporting the basic flat auxiliary mirror.

DETAILED DESCRIPTION

Figure 1:
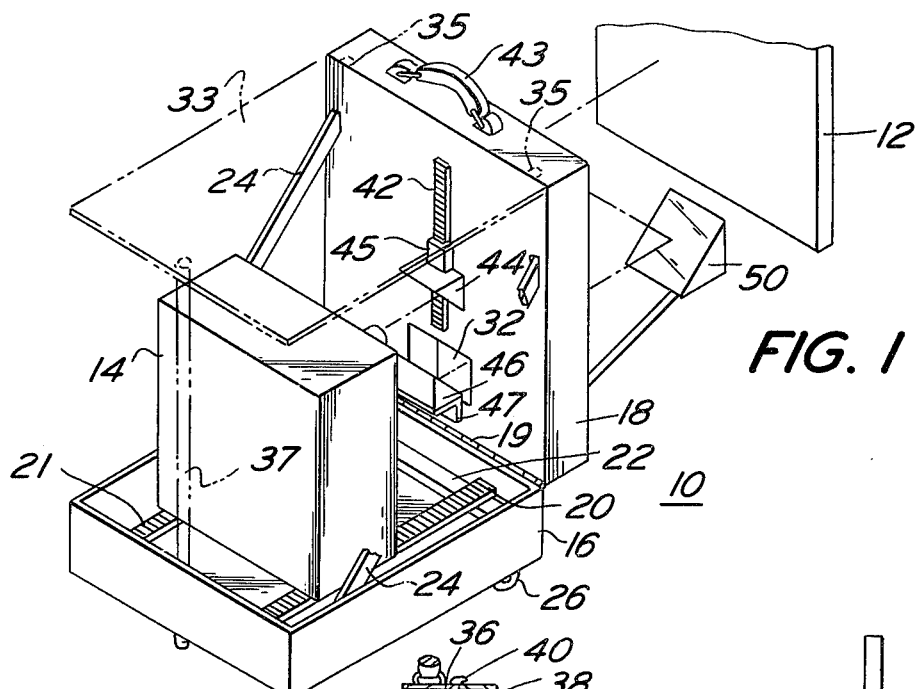
FIG. 1 is an isometric view showing the projection case assembly as used in the unique projection system herein described.

With reference to FIG. 1, the projection case assembly 10 is shown positioned in relation to a screen member 12 which is of large size and may be on the order of that shown in aforementioned copending application Ser. No. 488,011. A standard projector 14 which may be for slides or movies and can be of any physical configuration is shown supported within the projection case assembly 10. The projector itself will not be stored in the subject projection case and will only be positioned there during the actual showing of the movies or slides.

Figure 2:
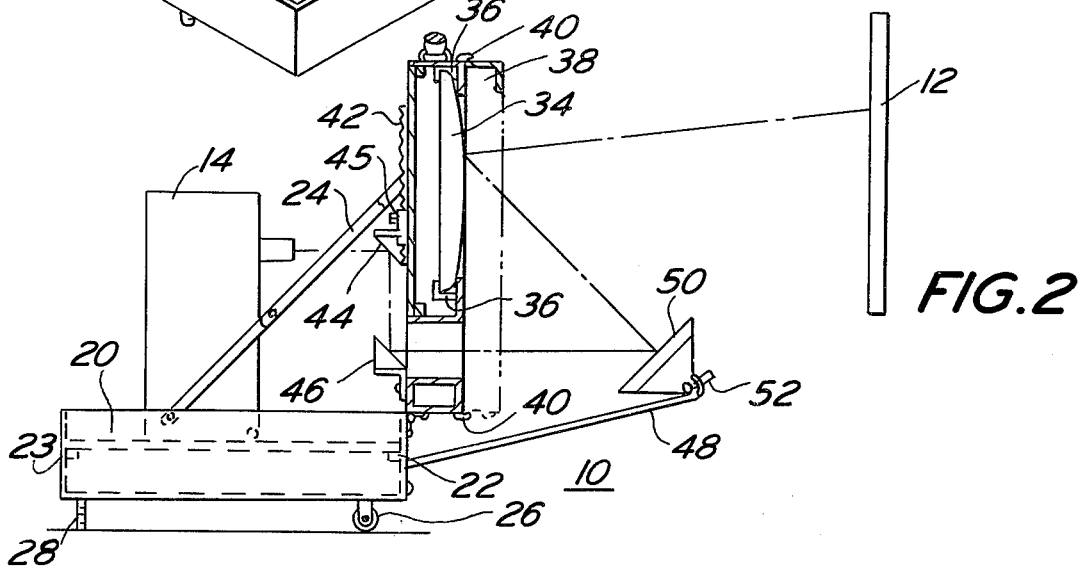
FIG. 2 is a side view of the projection case assembly of FIG. 1.

The projection case includes a base compartment member 16 and an upright member 18 which are secured to each other by a hinge 19, similar to a brief case or suitcase type arrangement. Within base member 16, support members 20 and 21 may be supported by ridges 22 and 24 (see FIG. 2). Elements of the assembly may be stored in the case when projection is not taking place and in place of support members 20 and 21, a solid plank extending widthwise across the inside of base member 16 may be used to better secure elements in the case during storage. A foldable support element 24 joins the base and upright members 16 and 18, respectively, and may further include a vernier type adjustment means (not shown) to precisely angularly position the upright member 18 with respect to the base member 16. Small wheels 26 are positioned below the base member 16 and while two in the front portion are shown, any convenient number may be utilized. An adjustment member, which may be of threaded screw variety or of spring loaded construction as is commonly used with projection equipment today, is shown also extending downwardly from the base member 16. Both the wheels 26 and adjustment member 28 may be retractable within or detachable from the case.

The upright member 18 has a projection slot 32 through which the beam from projector 14 will be projected. The upright member 18 also acts as part of a light shield which protects the screen from stray light and protects the viewers from the bright light of the projector bulb without affecting the ventilation requirements of the projector. The light shield further includes a canopy type overhead portion 33 which may be plastic or other suitable material, snapped or otherwise secured by fasteners 35 to the upright member 18 and further supported by pole-like member 37 which is readily removable when the assembly is to be disassembled. The inside of overhead portion 33 is preferably painted black to absorb escaping light rays from the projector. Since in normal operation, the projector case assembly 10 will be placed close the the screen 12, light shielding means as disclosed herein is important for otherwise light from the projector bulb will be distracting to viewers.

Positioned above the slot structure 32 is a uniquely designed convex mirror 34 which is utilized in the system and which is described in detail in copending Application Ser. No. 488,074. The mirror 34 which is mounted on the external side of folding member 18 may be secured by any convenient means such as clamps 36 which may be screw type arrangement to provide for adjustability in positioning the mirror. The upright member 18 has an outer cover 38 which when the projection system is not in use, may be used to protect the mirror (see FIG. 5). The cover is snapped in place by clamping means 40 shown at the top and bottom of the device. The cover 38 may be constructed of polystyrene or another soft material with a hard outer shell which will thoroughly protect the mirror when stored.

On the inside of the upright member 18, vertical adjustment means 42 which may comprise a series of notches or teeth is used to position an upper alignment mirror 44 securable by thumb screw 45 at the height necessitated by the projection beam from projector 14. This height will vary from projector to projector and thus, the vertical adjustability feature is necessary to make the system compatible with a wide range of different types of projectors. A companion lower alignment mirror 46 is mounted on bracket 47 below the upper mirror 44 and reflects the beams therefrom outwardly through the slot structure 32. The slot 32 may extend vertically upward further than shown in FIG. 1 so that projectors of varying heights may be used without the necessity of using the alignment mirrors 44, 46.

Figure 5:
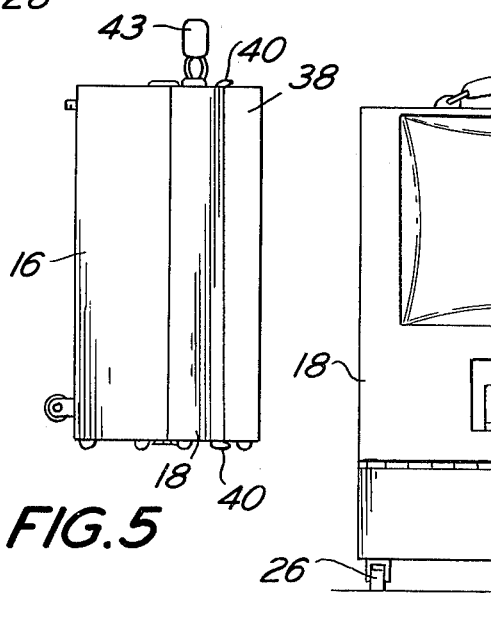
FIG. 5 is a side view showing the projection case assembly of FIG. 1 when not in use.
Figure 4:
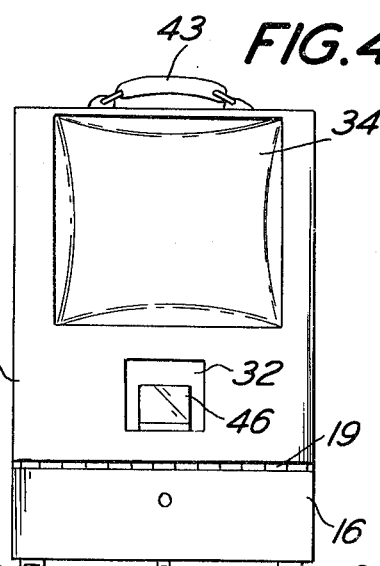
FIG. 4 is a front view of the projection case assembly of FIG. 1.
Figure 3:
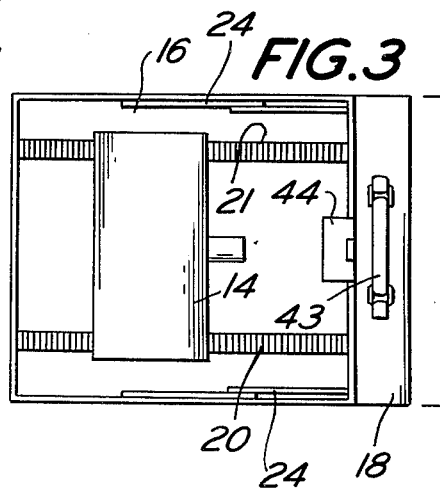
FIG. 3 is a top view of the projection case assembly of FIG. 1.

A handle 43 is shown affixed to the top edge of upright member 18 and enables the unit to be carried with ease when closed as shown in FIG. 5.

Extending outwardly from the base member 16 is an extension member 48 which may be telescopic and/or screw threaded into base member 16. The extension member 48 is for the purpose of supporting a flat auxiliary mirror 50 which is adjusted by means of adjustment means 52. The flat auxiliary mirror 50 may be foldable upon itself or collapsable and can be stored in the base member 16 when not in use.

The projection case assembly is utilized to support the projector 14 as above described and when the actual projection takes place, it is used in the following manner. The alignment mirror 44 must be adjusted to reflect the beam from the projector 14 downwardly onto alignment mirror 46 from which the beam is reflected through the slot 32 to auxiliary flat member 50. It reflects from auxiliary flat mirror 50 to convex mirror 34 from which it is reflected onto the screen member 12. In this manner and by use of the unique design of the convex mirror 34, enlarged images may be viewed distortion-free on the screen which may be full wall size or on the order of 6 by 8 feet.

The convex mirror 34 which is described in detail in copending Application Ser. No. 488,074 is produced from utilizing predetermined variables such as size of viewing areas. The configuration of the mirror 34 will vary depending on the variables of the desired system.

Once projection is completed, the cover 38 may be snapped on the upright member 18 and the mirror 50 and extension 48 disassembled and placed within the base member 16. The projector 14 is removed and the case may be folded into the compact unit shown in FIG. 5.

By means of the various adjustment features and the alignment means 42 for the mirror 44, the elements can be adjusted to provide precise focusing with a minimum of difficulty thus facilitating the setting up of the equipment.

While various embodiments of the invention have been shown and described, it will be understood that other modifications may be made. The appended claims, therefore, are intended to define the true scope of the invention.

We claim:

1. A projection case assembly unit for utilization with a standard projector and a system of mirrors which together provide enlarged exact images on a receiving surface removed from said projection case assembly comprising:
   a two-part foldable device having first and second sides which when folded, said sides are substantially parallel one to another to provide a compartment therebetween and which when said device is opened, said sides provide a base member and an upright member;
   means connected to said base member for supporting a projector upon said base member;
   a first mirror which is convex;
   means for securing said first mirror on said upright member with said reflective surface of said mirror facing outwardly from said base member;
   a second mirror which is substantially flat; and
   an extension member removably attached to said device and when attached extending outwardly from said device including means by which said second mirror is attached thereto and positioned to receive a projected beam and direct the beam against said first mirror whereby an enlarged image can thereby be reflected onto the receiving surface.

2. The projection case assembly unit of claim 1 further including third and fourth mirrors attached to said upright member, at least one of said third and fourth mirrors being adjustable vertically along said upright member to provide a means for reflecting beams from projectors of different heights.

3. The projection case assembly unit of claim 1 including a means of storing said first mirror secured to said upright member including an outer cover member which is attachable to said upright member.

* * * * *